J. M. CAMPBELL.
GEAR CUTTING ATTACHMENT FOR LATHES.
APPLICATION FILED OCT. 19, 1908.

955,498.

Patented Apr. 19, 1910.

Witnesses
E. F. Stewart
F. T. Chapman

Inventor
James M. Campbell.
By C. A. Snow & Co.
Attorneys

UNITED STATES PATENT OFFICE.

JAMES M. CAMPBELL, OF JOPLIN, MISSOURI.

GEAR-CUTTING ATTACHMENT FOR LATHES.

955,498.   Specification of Letters Patent.   Patented Apr. 19, 1910.

Application filed October 19, 1908. Serial No. 458,442.

*To all whom it may concern:*

Be it known that I, JAMES M. CAMPBELL, a citizen of the United States, residing at Joplin, in the county of Jasper and State of Missouri, have invented a new and useful Gear-Cutting Attachment for Lathes, of which the following is a specification.

This invention has reference to improvements in gear cutting attachments for lathes and its object is to provide an attachment for ordinary lathes especially the engine type of lathes whereby either one or a number of gears may be cut at one time with great facility.

By the present invention an ordinary lathe may be converted, without change of structure, into a gear cutting machine capable of turning out gears as expeditiously and quickly as the special machines built for the purpose and after the work is done the attachment may be removed and the lathe is in condition for its ordinary use as before.

The invention will be best understood from a consideration of the following detail description taken in connection with the accompanying drawings forming a part of this specification, with the understanding however that while the showing of the drawings is of an operative machine the invention is capable of other embodiments than the particular one shown and therefore is not confined to the exact structure illustrated.

Figure 1:
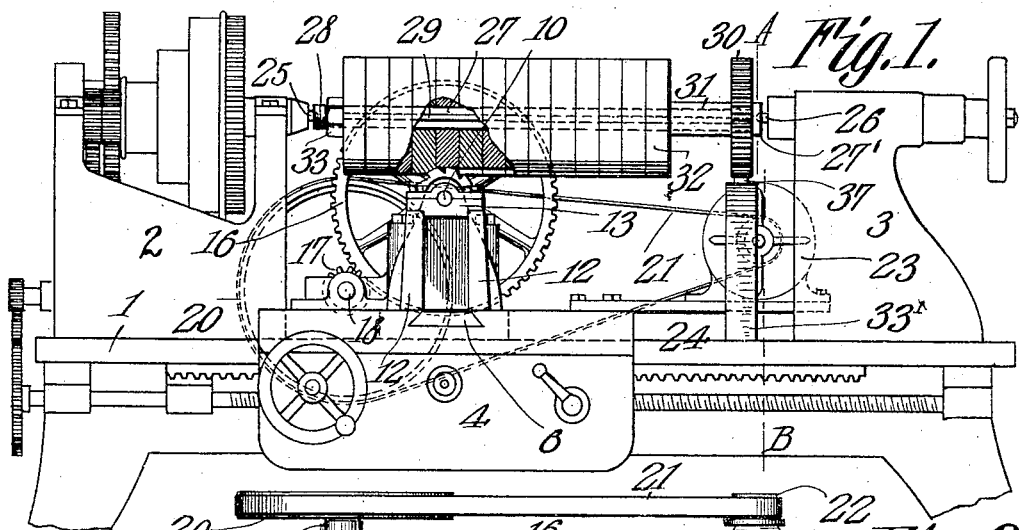
Figure 2:
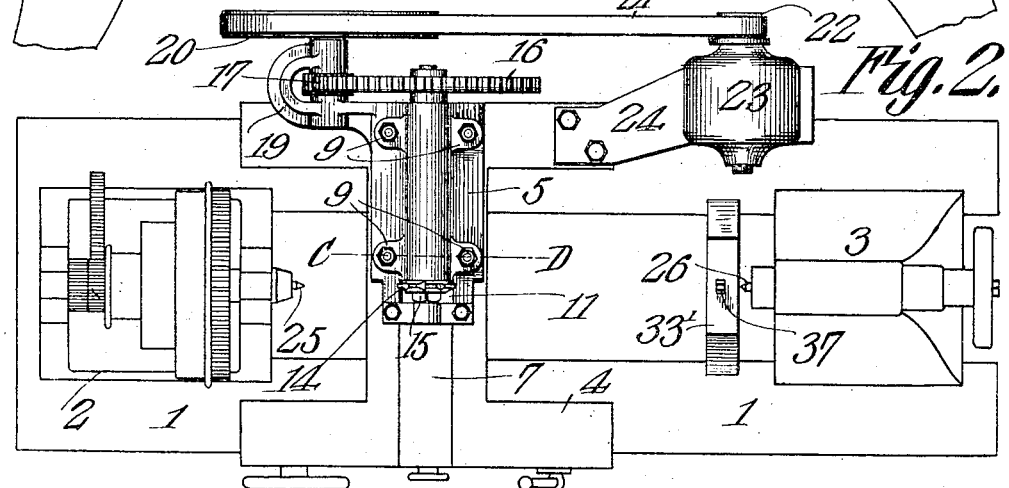
Figure 3:
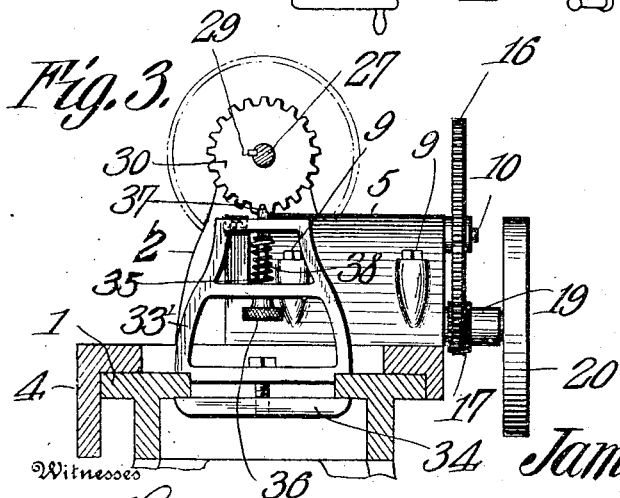
Figure 4:
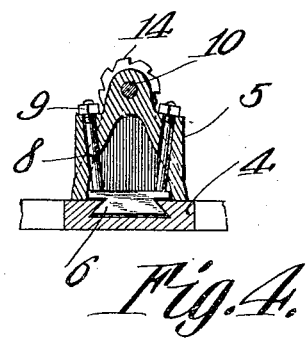

In the drawings, Figure 1 is a side elevation of the working parts of an ordinary lathe with the attachment applied showing some parts of the latter in section. Fig. 2 is a plan view of the structure shown in Fig. 1 with parts of the showing of Fig. 1 omitted. Fig. 3 is a vertical cross section on the line A—B of Fig. 1. Fig. 4 is a cross section on the line C—D of Fig. 2.

Referring to the drawings there is shown the bed 1, head stock 2, tail stock 3, and tool carriage 4 of an ordinary engine lathe. The showing of the drawings so far as the lathe is concerned is not to be taken as illustrating any particular type of lathe but simply indicative of any suitable type without regard to any special make or design.

By the present invention there is provided a member 5 designed to replace the cross feed block of the tool carriage and this member 5 is provided with dove-tailed blocks 6 adapted to fit in the dove-tailed groove 7 of the tool carriage provided for the reception of the ordinary cross feed member. In order that the member 5 may be securely anchored to the tool carriage when once in position the dove-tailed blocks 6 are secured to one end of bolts 8, the other ends of which extend up through the member 5 and receive nuts 9 at their upper ends so that the blocks 6 may be drawn into the interior of the member 5 and thus lock the latter to the tool carriage when the blocks 6 are in the dove-tailed groove 7, and the member 5 has been adjusted to proper position.

In the upper portion of the member 5 there is formed a longitudinal bearing for a shaft 10 in a direction parallel with the length of the groove 7. One end of the member 5 is recessed or cut away as shown at 11 and beyond this cut-away portion the member 5 is formed with two spaced pedestals 12 upon the upper end of which is carried a journal bearing 13 for the corresponding end of the shaft, and in the space or recess 11 between the journal bearing 13 and the adjacent end of the member 5 the shaft 10 carries a rotary cutter or milling tool 14 held to the shaft by the nuts 15 so that the tool may be readily replaced when so desired. It will be understood of course that different milling tools are necessary for different types of gear teeth and that it is also necessary from time to time to remove the milling tool for re-sharpening.

The end of the shaft 10 remote from the cutter 14 carries a gear wheel 16 and this gear wheel is in mesh with a pinion 17 on a short shaft 18 mounted in bearings in a yoke 19 fast on the member 5 at an appropriate point thereon. The shaft 18 projects in a direction away from the gear wheel 16 beyond its bearings and there carries a pulley 20 connected by a belt 21 to a pulley 22 on the armature shaft of an electric motor 23 mounted on a bracket 24 made fast to the tool carriage 4 in any appropriate manner or which bracket may be if so desired cast on the member 5. Since electric drive is very common in machine shops even of the smaller type, the electric motor 23 forms a convenient means for driving the cutter 14 through the intermediary of the belt 21 and pulley 20 and the gears 16 and 17, these connections serving to cut down the speed between the motor and the cutter. Furthermore an independent power unit is advantageous since as will hereinafter appear the carriage 4 is moved upon the bed 1 in the operation of the attachment. However this does not preclude the use of other power means than the motor 23 and therefore the cutter 14 may be driven by any suitable source of power connected in any manner thereto.

When the attachment forming the subject matter of the present invention is used upon a lathe the head and tail stock spindles carry plain centers 25 and 26 respectively and between these centers there is mounted an arbor 27 provided with end recesses for the reception of the respective points 25 and 26. This arbor is provided with a head 27' at one end and is screw-threaded as indicated at 28 at the other end while along the length of the arbor or for as long a distance as may be necessary the latter is provided with a spline 29 which may, as is customary, be seated in a keyway formed in said arbor so that longer or shorter splines may be used. It will be understood that the screw threads 28 may extend along as great a portion of the arbor as may be deemed necessary.

At the headed end of the arbor 27 there is located a pattern gear wheel 30 constrained to rotate with said arbor by means of the key 29 which passes through said gear wheel 30. Upon the arbor adjacent to the gear wheel 30 there is placed a spacing sleeve 31. Then there are strung upon the arbor as many blanks 32 as the arbor will hold and finally a nut 33 is applied to the threaded end 28 of the arbor and serves to clamp all these blanks together with the sleeve 31 and pattern 30 upon said arbor. By varying the length of the spacing sleeve 31 a greater or less number of blanks 32 may be placed upon the arbor and clamped thereto by the nut 33. Of course if a small number of blanks is to be cut or thinner or thicker blanks are to be cut than those for which a special arbor is made, then a shorter or longer arbor, as the case may be, may be employed depending on the length of the bed of the lathe. There is also provided a frame 33' adapted to rest on and be adjustable longitudinally of the frame 1 between the carriage slide and tail stock and this frame 33' carries a clamp member 34 for the purpose of securing the frame in place when adjusted. Mounted in the frame 33' is a longitudinally movable rod 35 having at one end a head 36 by means of which the rod may be manipulated and at the other end a tooth 37 adapted to enter between the teeth of the pattern wheel 30. Between two members of the frame 33' the rod 35 is surrounded by a helical spring 38 and this spring engages the said rod in such manner as to force the tooth 37 between the teeth of the pattern wheel and yet this spring will yield when the rod is moved by grasping the manipulating head 36 so that the tooth 37 may be withdrawn from between the teeth of the pattern wheel 30.

Now let it be assumed that a number of blanks 32 have been mounted upon an arbor 27 and the latter has been in turn mounted between the centers 25 and 26 on the head and tail stocks respectively of the lathe. Also let it be assumed that the tooth 37 engages between the teeth of the pattern wheel 30 so that the arbor 27 is held against rotation thereby. Furthermore let it be assumed that the direction of rotation of the lathe members is such that the tool carriage will be moved toward the head stock instead of toward the tail stock as usual, and let it also be assumed that the carriage is so adjusted that the cutter 14 is close to the tail stock out of engagement with the blanks 32.

Now in starting the motor 23 rotary motion is imparted to the cutter 14 in a counter-clockwise direction as viewed in Fig. 1 and the tool carriage is either by hand or by the movement of the gearing of the lathe through power properly applied caused to travel in a direction toward the head stock which is toward the left as viewed in Fig. 1. Under these circumstances the cutter 14 is carried along the several blanks 32 in succession and cuts therein a groove representing the space between two gear teeth. When this has been accomplished the carriage is returned to its initial position and the tooth 37 is removed from between the teeth of the pattern wheel 30 and the arbor 27 is then moved a distance equal to the space between two of the teeth of the pattern wheel 30 and the tooth 37 is permitted to again engage between the next adjacent teeth of the pattern wheel 30 thus locking the arbor with the blanks thereon in the new position. Again the carriage 4 is impelled toward the head of the lathe and another groove is cut parallel with the first thus producing a single gear tooth throughout the several blanks. This operation is repeated again and again until the gear teeth are produced about the entire circumference of the blanks 32 and thereby the several blanks are converted into gears with cut teeth agreeable to the pattern 30. It is to be noted that the cutter underrides the blanks directly below the arbor 27 and therefore any tendency of the cutter to move away from the blanks and thus cut a shallow groove is resisted by the solidity of the lathe bed. Furthermore since the lathe head is a solidly connected structure the feeding of the cutter toward the lathe head prevents any tendency of the parts to slip out of position as might be the case if the cutter were fed toward the tail stock.

In the simple form of the invention as shown in the drawings gears of larger diameter may be cut by raising the head and tail stocks upon blocks as is customary in increasing the swing of a lathe.

While the embodiment of the invention shown in the drawings permits the cutting of gears to those of one diameter only or of greater diameters by the introduction of the usual D-blocks under the head and tail stocks it is of course evident that the cutter shaft and also the support for the tooth 37 may be made vertically adjustable within limits to permit the cutting of gears of different diameters without the necessity of using the elevating blocks under the head and tail stocks. However this last suggested structure would necessitate an increase in the mechanical parts with a corresponding increase in the cost of manufacture and complication of the structure.

The embodiment shown in the drawings is of simple construction, easily and cheaply manufactured, and may be sold at a good profit at a comparatively cheap price, thus adapting the invention for use in small machine shops where the large and expensive gear cutting machines or milling machines are out of the question.

While the invention is particularly useful in small shops, this does not at all preclude its usefulness in large shops when lathes are available for the purpose and may be readily used in place of special gear cutting machinery.

What is claimed is:—

1. A gear cutting attachment for lathes comprising a carrier adapted to replace the cross feed block of the lathe tool carriage, said carrier having a journal bearing formed therethrough and in line with the journal bearing having one end recessed and there formed on opposite sides of the recess with pedestals, a journal bearing on the pedestals, and a cutter shaft in the bearings on the body of the carrier and in the bearings on the pedestals, and adapted to receive a cutter between the bearings on that part of the shaft coincident with the recess in the carrier.

2. In a gear cutting attachment for lathes, an arbor having a head at one end and threaded at the other end and adapted to receive gear blanks, a pattern gear on the arbor at the headed end thereof, said arbor being provided with means for clamping the gear blanks and pattern gear thereon, and a clamp frame mounted on the lathe bed between the head and tail stocks and provided with means for engaging the pattern gear and holding the arbor in adjusted positions about its longitudinal axis.

In testimony that I claim the foregoing as my own, I have hereto affixed my signature in the presence of two witnesses.

JAMES M. CAMPBELL.

Witnesses:
W. S. BOYD,
E. A. WILLIAMS.